US012798083B2

(12) United States Patent
Herbst et al.

(10) Patent No.: US 12,798,083 B2
(45) Date of Patent: Nov. 17, 2026

(54) METHOD FOR OPERATING A MACHINE WITH A LINEAR MOTOR

(71) Applicant: B&R Industrial Automation GmbH, Eggelsberg (AT)

(72) Inventors: Michael Herbst, Seeham (AT); Stefan Brucker, Salzburg (AT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/976,543

(22) Filed: Dec. 11, 2024

(65) Prior Publication Data

US 2025/0242486 A1 Jul. 31, 2025

(30) Foreign Application Priority Data

Jan. 29, 2024 (EP) .................................... 24154452

(51) Int. Cl.
*B25J 9/12* (2006.01)
*B25J 13/00* (2006.01)
*H02K 33/12* (2006.01)

(52) U.S. Cl.
CPC ............. *B25J 9/123* (2013.01); *B25J 13/003* (2013.01); *H02K 33/12* (2013.01)

(58) Field of Classification Search
None
See application file for complete search history.

(56) References Cited

U.S. PATENT DOCUMENTS 6,876,107 B2 4/2005 Jacobs
9,202,719 B2 12/2015 Lu et al.
10,227,182 B2 * 3/2019 Burk ...................... B65G 54/02
10,246,266 B2 * 4/2019 Weber .................... B65G 43/02
11,245,348 B2 * 2/2022 Flixeder ................ B60L 13/006
11,515,762 B2 * 11/2022 Forthuber .............. B65G 23/08
11,608,235 B2 * 3/2023 Kastinger .............. B65G 54/02
11,767,174 B2 * 9/2023 Das ........................ B65G 43/00 198/502.3
12,115,865 B2 * 10/2024 Hanis ...................... B60L 13/03
2013/0074724 A1 3/2013 King et al.
2017/0346379 A1 11/2017 Weber et al.
2022/0306406 A1 9/2022 Flixeder et al.
2023/0006529 A1 1/2023 Flixeder et al.

FOREIGN PATENT DOCUMENTS

WO 2004/103792 A1 12/2004
WO 2013/143783 A1 10/2013

OTHER PUBLICATIONS

European Office Action for Application No. 24154452.7, dated Jul. 16, 2024, 6 pages.

* cited by examiner

*Primary Examiner* — Kavel Singh
(74) *Attorney, Agent, or Firm* — McCarter & English, LLP

(57) ABSTRACT

In order to allow flexible operation of a machine with a transport device having a linear motor, it is provided, that at least one excitation magnet is provided on a movable part of the machine, and that at least one of the plurality of drive coils is used as excitation coil that is energized with an excitation coil voltage for generating an alternating excitation electromagnetic field in the vicinity of the excitation coil, wherein the excitation electromagnetic field interacts with the excitation magnet for producing mechanical vibrations of the movable part of the machine, wherein said mechanical vibrations cause a sound that is used for the operation of the machine.

14 Claims, 4 Drawing Sheets

METHOD FOR OPERATING A MACHINE WITH A LINEAR MOTOR

CROSS-REFERENCE TO RELATED APPLICATIONS

The present application claims priority to European Patent Application No. 24154452.7 filed on Jan. 29, 2024, and titled "METHOD FOR OPERATING A MACHINE WITH A LINEAR MOTOR", which is hereby incorporated by reference in its entirety.

TECHNICAL FIELD

The present disclosure pertains to a method for operating a machine comprising a linear motor transport device, wherein the linear motor transport device comprises a plurality of drive coils that are at least temporarily energized with a drive coil voltage for generating a drive electromagnetic field that interacts with a drive magnet of at least one shuttle of the linear motor transport device for driving the at least one shuttle. The present disclosure pertains also to a corresponding machine.

BACKGROUND

Long stator linear motors (LLM) and planar motors (PLM) are well known transportation devices used in many applications for transporting objects with shuttles of the LLM or PLM. A shuttle of an LLM or a PLM is moved by interaction of (electro) magnetic fields. An (electro) magnetic field is generated by drive magnets, for example in the form of permanent magnets or electromagnets, of the shuttle. A drive electromagnetic field is generated by drive coils on a stator of the LLM or PLM. The interaction between the drive (electro) magnetic field and the drive electromagnetic field generates a drive force acting on the shuttle in a certain direction, said drive force moves the shuttle in direction of the drive force. By controlling the energization of the drive coils such that the drive electromagnetic field is moved, also the shuttle that interacts with the moving drive electromagnetic field is moved accordingly. Usually not all drive coils of the stator need to be energized, but only those active drive coils in the region of a shuttle. With an LLM, movement of the shuttle is essentially possible in movement direction in direction along the stator only. Only very limited movement (limited by the guide system guiding the shuttle along the stator) is possible in a direction across the movement direction and in other degrees of freedom. With a PLM, however, movement of the shuttle in all six degrees of freedom is basically possible. The main movement directions of a PLM shuttle are in a movement plane defined by the stator of the PLM in which movement plane the shuttle may be moved virtually without any restrictions.

With an LLM or a PLM, multiple shuttles may be moved simultaneously and independent from each other (except with regard to collision avoidance) by controlling energization of the drive coils that interact with the respective shuttles. This means that it is not necessary that always all coils are energized somehow, but only the coils interacting with a shuttle need to be energized. It is also possible to move shuttles with somehow synchronized movement or to move shuttles with a movement synchronized with another movement, of a robot arm, for example. Energization of a drive coils happens by an electrical drive coil current that is generated by applying a drive coil voltage to the drive coil. Changing the drive coil voltage changes the drive coil current and also the generated drive electromagnetic field. This allows control of the movement of a shuttle.

The basic concept of a LLM and PLM allows very flexible movements of its shuttles which makes LLM and PLM exceptionally suitable as transport systems in many applications.

Examples of long-stator linear motors can be found in WO 2013/143783 A1, U.S. Pat. No. 6,876,107 B2, US 2013/0074724 A1 or WO 2004/103792 A1. U.S. Pat. No. 9,202,719 B2, for example, discloses the basic structure and the mode of operation of a planar motor.

There is a need for a flexible operation of a machine with a linear motor as transport device.

BRIEF DESCRIPTION

This object is achieved, in that at least one excitation magnet is provided on a movable part of the machine, in that at least one of the plurality of coils is used as excitation coil that is energized with an excitation coil voltage for generating an alternating excitation electromagnetic field in the vicinity of the excitation coil, wherein the excitation electromagnetic field interacts with the excitation magnet for producing mechanical vibrations of the movable part of the machine, wherein said mechanical vibrations cause a sound that is used for the operation of the machine. As soon as the excitation magnet on the moveable part is sufficiently close to the excitation coil, the excitation magnet on the moveable part of the machine interacts with the alternating excitation electromagnetic field generated by the at least one excitation coil for causing the mechanical vibrations of the movable part and the sound.

Mechanical vibrations are usually highly undesired in machine applications because such mechanical vibrations cause audible noise, propagate through the machine and may cause negative effects on other parts of a machine, can cause sensible vibrations that may have negative effects on operators of the machine and so on. Therefore, the design and operation of a machine was hitherto aimed at avoiding mechanical vibrations as far as possible. This usually undesired effect of mechanical vibrations can however be used advantageously in a LLM or PLM application. The reason for that is that in such applications there are always drive coils for generating electromagnetic fields used for the propulsion of the shuttles of a LLM/PLM. It has been realized that a drive coil of the LLM/PLM of a machine application can be used to produce mechanical vibrations of a certain movable part of the machine application by applying an excitation to the coil that generates an excitation electromagnetic field. This alternating excitation electromagnetic field interacts with the excitation magnet of the movable part of the machine application but does only negligibly interfere with the normal operation of the machine, transport device or linear motor. The mechanical vibrations of this movable part cause sound in dependence on the excitation. The generated sound can then be used for the operation of the machine application. According to the present disclosure, mechanical vibrations are used deliberately and in a targeted manner to generate sound. The generated sound can be used manifold for operation of the machine application and can even be used for human-machine interaction or for triggering certain action in the machine. This allows very flexible operation of the machine. The drive coil of the LLM/PLM is present anyway and is used not only for its primary purpose, namely for the propulsion of the shuttles, but also for operation of the machine. The sound can be generated very flexibly in its volume, frequency or frequencies, frequency range and so on, and can therefore be used very flexibly for control purposes.

It is advantageous that the excitation magnet is provided on a shuttle of the linear motor of the transport device. This allows making operation of the machine dependent on a shuttle. It is especially advantageous when the drive magnet of the shuttle is simultaneously used as excitation magnet as there is then not need for an additional excitation magnet. In this case no additional hardware parts of the transport device are needed.

The generated sound can also be made dependent on a certain object, when the excitation magnet is provided on an object transported with a shuttle of the linear motor of the transport device. In the same way, the machine may comprise a handling device with a movable part, wherein the excitation magnet is provided on the movable part or on an object moved with the handling device.

In order not to interfere with the control of the drive electromagnetic field, the excitation voltage of a drive coil is superimposed on the drive coil voltage.

In an embodiment of the present disclosure, each one of several drive coils is energized with an excitation voltage simultaneously for generating the excitation electromagnetic field. This could be used to generate polyphonic sounds or certain sound effects.

The sound can travel with a moving shuttle, that is moved by generating a moving drive electromagnetic field by successively energizing successive drive coils with a drive coil voltage, in that the excitation voltage is superimposed on at least one of the successive drive coils.

BRIEF DESCRIPTION OF DRAWINGS

The present disclosure is described below in greater detail with reference to FIGS. 1 to 5, which show schematic and non-limiting advantageous embodiments of the present disclosure by way of example. In the drawings.

DETAILED DESCRIPTION

Figure 1:
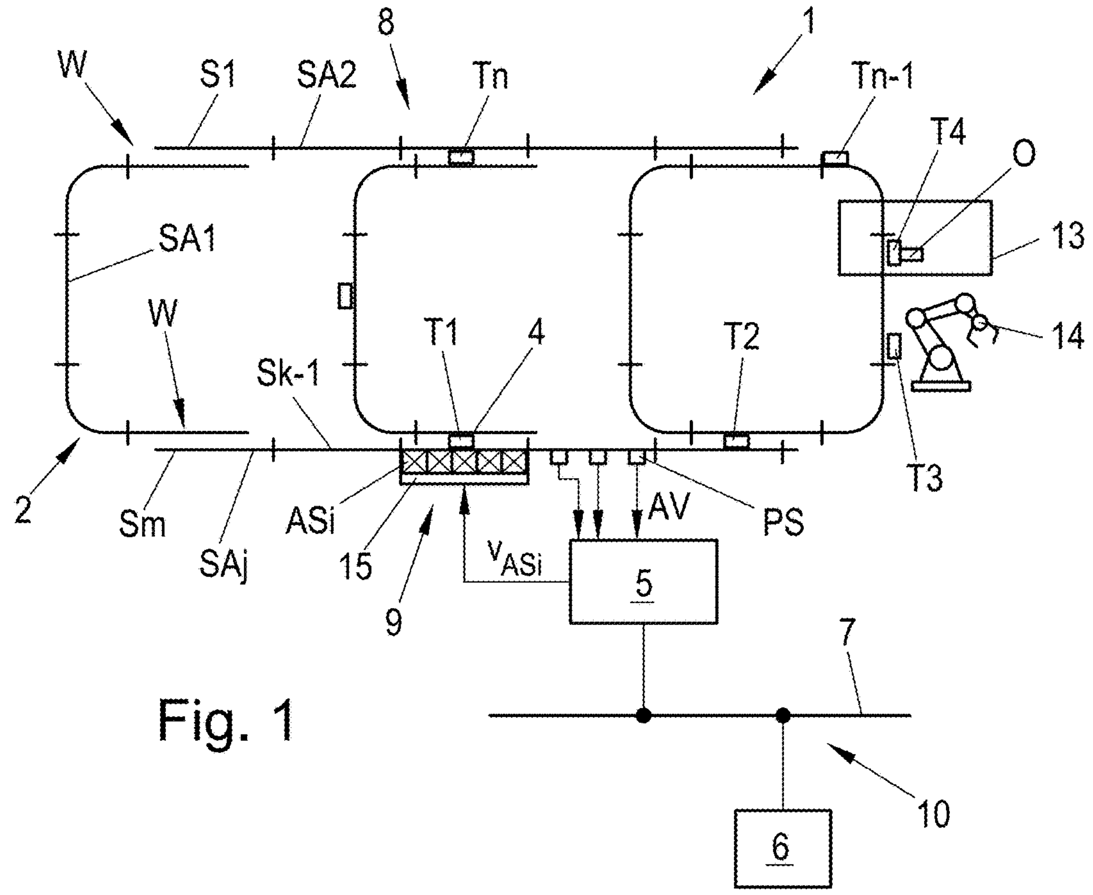
FIG. 1 is an exemplary embodiment of a machine with a long stator linear motor as transport device.

The present disclosure as described in the following pertains to a machine 8 comprising a transport device 1 that comprises a linear motor 9. The linear motor 9 comprises plurality of drive coils ASi that are at least temporarily energized with a drive coil voltage $v_{ASi}$ for generating a drive electromagnetic field that interacts with a drive magnet 4 of at least one shuttle Tn of the linear motor 9 for driving the at least one shuttle Tn. The linear motor 9 transports an object O on a shuttle Tn. Such a machine 8 is exemplarily shown in FIG. 1.

The transport device 1 of the machine 8 may comprise several linear motors 1, also different types of linear motors (see below). The several linear motors 9 may be interconnected with each other. The transport device 1 may—additionally to a linear motor 9—also comprise further well-known conveyor devices (not shown for sake of simplicity), like an endless conveyor (belt or chain conveyor for example), a gravity conveyor, and so on, for transporting an object O, a shuttle Tn or a shuttle Tn carrying an object O. The conveyor device may be interconnected with the linear motor 9.

The machine 8 may further comprise at least one processing station 13. In the processing station 13 a certain task is performed on or with an object O transported with the transport device 1, with a shuttle Tn for example. The object O can be transported in the processing station 13, into the processing station 13 and/or out of the processing station 13 with the transport device 1, i.e. with the linear motor 9 or an additional conveyor device.

The machine 8 may also comprise at least one handling device 14, like an industrial robot, for interaction with a shuttle Tn or an object O carried by a shuttle Tn or transported on an additional conveyor device. The interaction between handling device 14 and object O can take place in a processing station 13 or along the track of the transport device 1, even while the shuttle Tn or object O is moving. The handling device 14 can be designed as serial kinematics or parallel kinematics or in any other known robot design.

The linear motor 9 may be designed as long-stator linear motor (LLM) or planar motor (PLM). In the example of FIG. 1 the linear motor 9 is designed as LLM and in FIG. 2 as PLM. It is however of course also possible to use an LLM and a PLM as transport device 1 in a machine 8. In the following it is only differentiated between LLM and PLM where necessary. To better understand the present disclosure, the basic well-known principle and construction of a LLM and PLM is explained in the following with reference to FIG. 1 and FIG. 3*a*, 3*b*.

Figure 2:
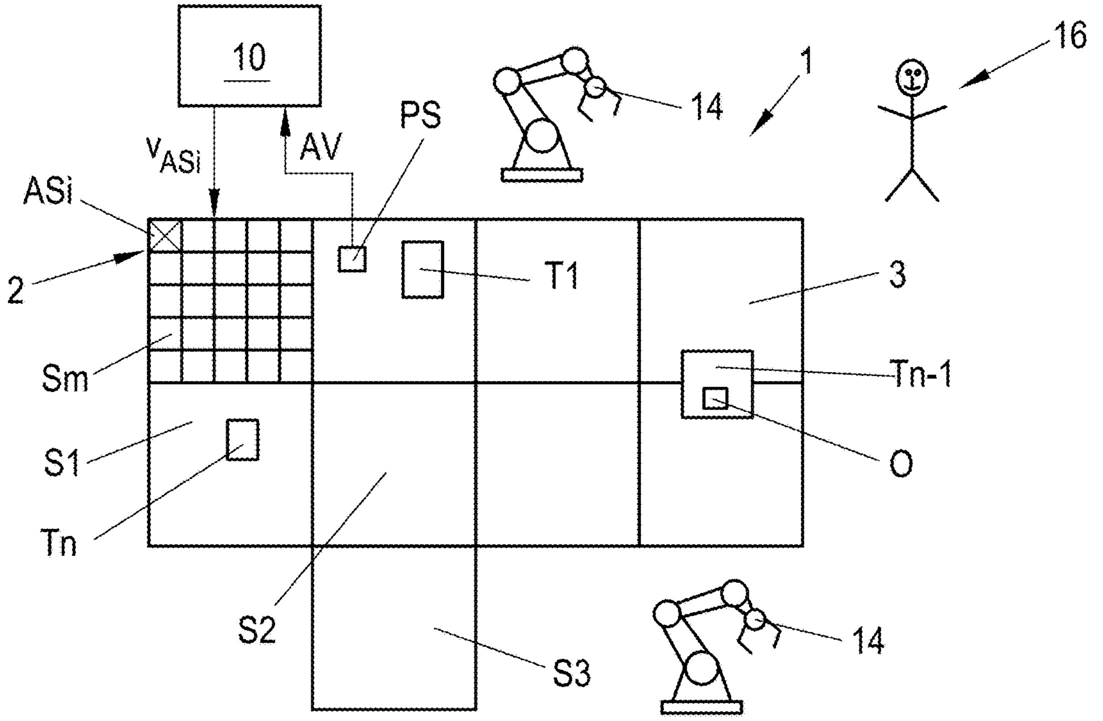
FIG. 2 is an exemplary embodiment of a machine with a planar motor as transport device.
Figure 3A:
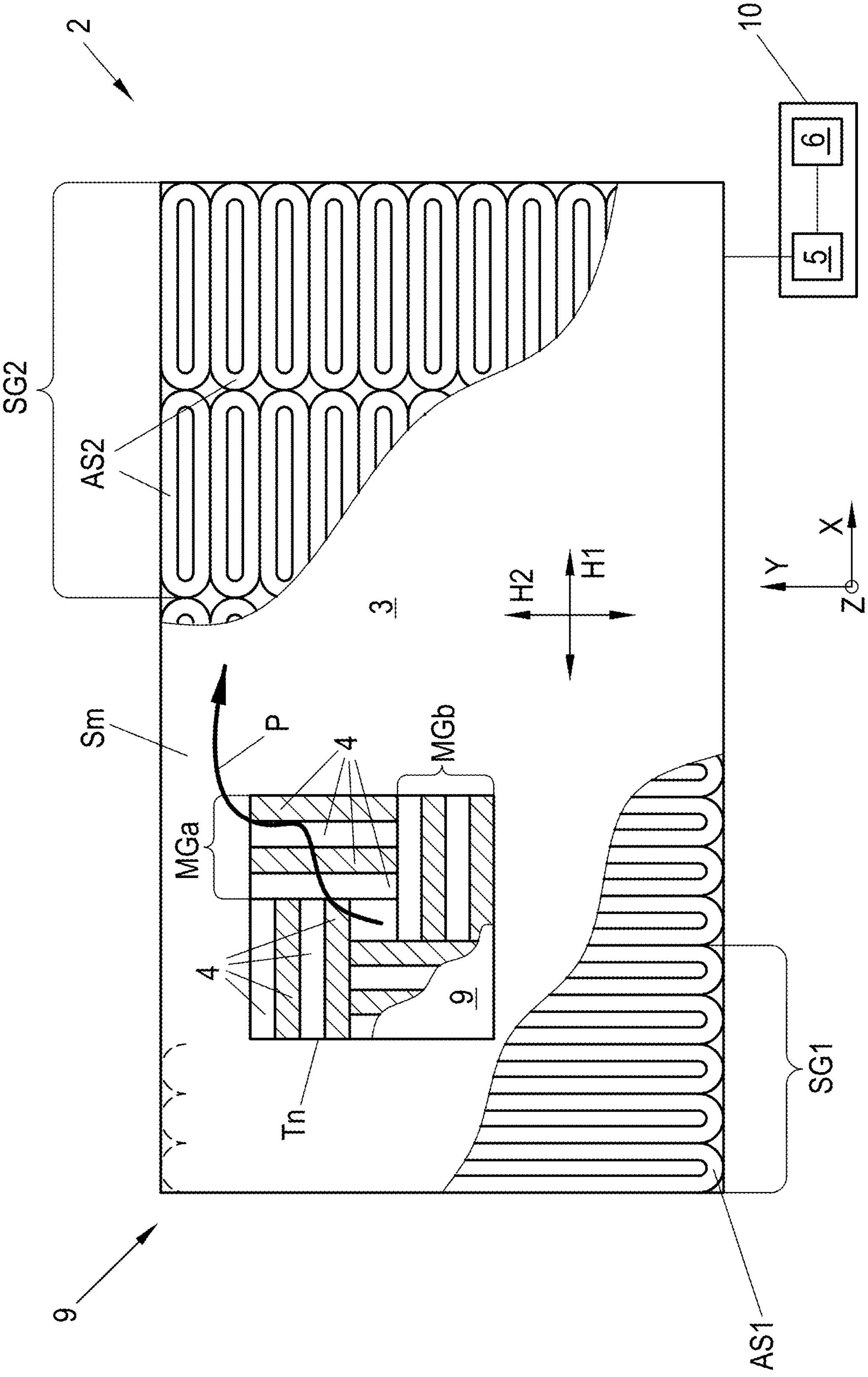
FIG. 3*a* and FIG. 3*b* are different views of a possible embodiment of a planar motor.
Figure 3B:
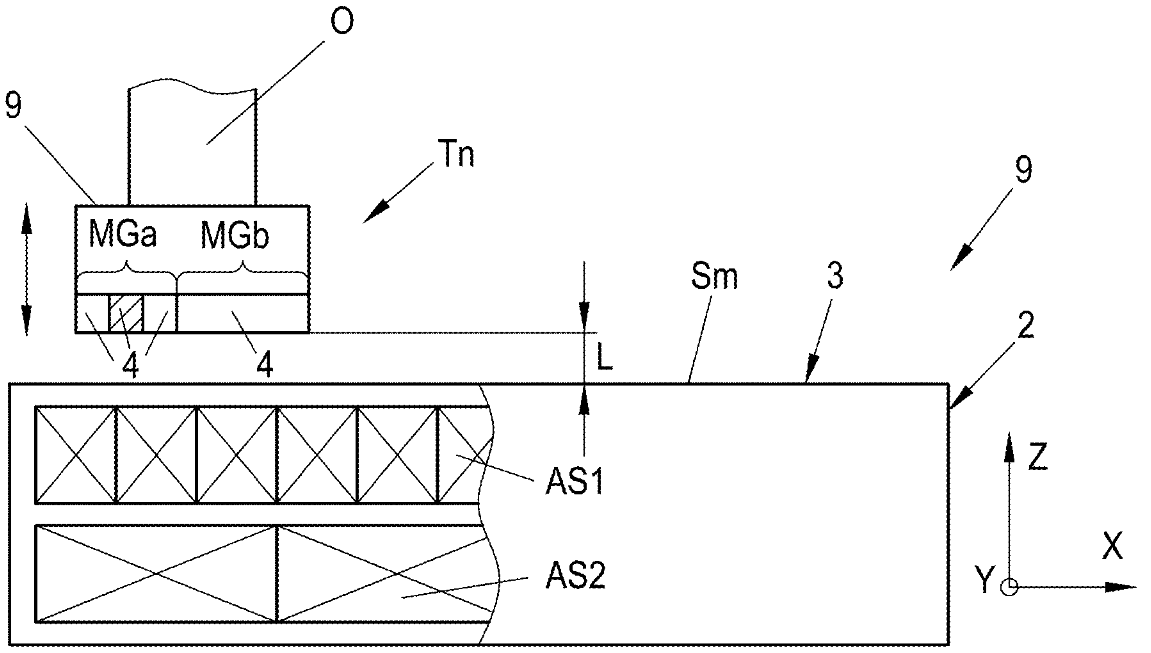

With reference to FIG. 3*a* and FIG. 3*b* the well-known principle and design of a planar motor as example of a linear motor 1 of the transport device 1 is explained by way of an exemplary embodiment. FIG. 3*a*, 3*b* show a simplified exemplary embodiment of a transport device 1 in the form of a planar motor. FIG. 3*a* shows the planar motor in a partially broken-away plan view, and FIG. 3*b* shows the planar motor in a partially broken-away side view. The planar motor has at least one stator segment Sm. “m” is used as an index in order to be able to distinguish different stator segments, wherein, generally, the reference sign Sm is used when no specific stator segment is addressed. The stator segment(s) Sm form the stator 2 of the PLM with a movement plane 3. At least one shuttle Tn is movable in the movement plane 3 at least two-dimensionally in two main movement directions H1, H2, that correspond to X and Y axis of a coordinate system. “n” is used as an index in order to be able to distinguish different shuttles, wherein, generally, the reference sign Tn is used when no specific shuttle is addressed. The movement plane 3 can be oriented in space in any way but usually forms a flat surface. For the sake of simplicity, only one stator segment Sm is shown in FIG. 3*a*. Of course, a plurality of stator segments Sm (which can be different in shape) are usually arranged next to each other in order to form the stator 2 and a larger movement plane 3 (as in FIG. 2). As a result, the PLM can have a modular workspace in which the shuttles Tn can move defined by the arrangement of stator segments Sm. Movement planes 3 of different shapes and sizes can be realized by arranging stator segments Sm in the desired way. In the movement plane 3 of the stator 2, several shuttles Tn can naturally also be moved simultaneously and independently of one another. It is even possible to use shuttles Tn of different size or shape, for transporting different objects O on the shuttles Tn, for example.

It is to note, that the useable workspace does not necessarily correspond to the complete movement plane 3 formed by the stator segments Sm. It is possible that some or all shuttles Tn are blocked from entering certain defined regions of the movement plane 3, for example.

A first coil group SG1 with several drive coils AS1, which defines the first main movement direction H1, and a second coil group SG2 with several drive coils AS2, which defines the second main movement direction H2, are arranged on each stator segment Sm. In general, the drive coils are also designated by ASi, where "i" is an index, in order to be able to distinguish the drive coils if necessary. The drive coils ASi of the first coil group SG1 are arranged next to each other in a specific direction—in this case, in the X-direction of a Cartesian coordinate system—in order to form the first main movement direction H1 for the movement of the shuttle Tn, which in this case extends along the X-axis. The drive coils ASi of the second coil group SG2 are arranged next to each other in a specific direction—in this case, the Y-direction of a Cartesian coordinate system—in order to form a second main movement direction H2 for the shuttle Tn, which in this case extends along the Y-axis. In some embodiments, the drive coils AS1, AS2 of the first and second coil groups SG1, SG2, as shown in FIG. 3*a*, are arranged relative to one another such that the two main movement directions H1, H2 are orthogonal to one another.

At least on drive magnet 4 is arranged on the at least one shuttle Tn, which interacts electromagnetically with drive coils ASi of at least one of the two coil groups SG1, SG2 in the region of the shuttle Tn for moving the shuttle Tn. Usually several drive magnets 4 are arranged on the shuttle Tn, also in different polarity. For this purpose, the PLM shuttle Tn generally has a main body 9, on the underside of which (facing the movement plane 3) the drive magnets 4 are arranged, as can be seen in FIG. 3*b*. In FIG. 3*a*, the main body 9 is shown largely broken away to be able to see the arrangement of the drive magnets 4. As indicated in FIG. 3*b*, the drive magnets 4 are arranged in several magnet groups MGa, MGb. The drive magnets 4 are usually arranged with alternating polarity, as indicated in FIG. 3*a*. The drive magnets 4 can also be oriented differently in the different magnet groups MGa, MGb.

In the example shown, two first magnet groups MGa and two second magnet groups MGb are arranged on the shuttle Tn. A single first magnet group MGa and a single second magnet group MGb per shuttle Tn are substantially sufficient to move the shuttle Tn in two directions in the movement plane 3. Of course, more than two first magnet groups MGa and more than two second magnet groups MGb can also be arranged per shuttle Tn. There are many different arrangements of magnet groups MGa, MGb known, like a 1-D arrangement, 2-D arrangement, a Halbach arrangement etc.

With a PLM as shown in FIG. 3*a* and FIG. 3*b*, a substantially unrestricted movement of a shuttle Tn in the two main movement directions H1, H2 would be possible, for example, in the movement plane 3 of the stator segment 2. It could in this case be possible to move the shuttle Tn, for example, only along the X-axis or only along the Y-axis. The shuttle Tn can naturally be moved simultaneously in both main movement directions H1, H2, e.g., along any possible two-dimensional movement path P lying in the movement plane 3 with an X-coordinate and a Y-coordinate, as indicated on the shuttle Tn in FIG. 3*a*. Of course, it is possible that there are different movement paths P for different shuttles Tn. But also the other four degrees of freedom can also be used at least to a limited extent (translational movement in the vertical direction Z and rotation about the three axes X, Y, Z).

Drive coils ASi can also be arranged one above the other (here, in the Z-direction). In the embodiment according to FIG. 3*b*, the drive coils AS1 of the first coil group SG1 are arranged closer to the movement plane 3 in the direction perpendicular to the movement plane 3 (here, in the Z-direction) than the drive coils AS2 of the second coil group SG2. There are many different arrangements of drive coils ASi known, like a single-layer arrangements, a herringbone arrangement, a double-layer arrangement etc.

In operation of the planar motor, in a possible embodiment, a moving magnetic field is generated in the first main movement direction H1 by corresponding activation of the first drive coils AS1 that interact with a shuttle Tn. The moving magnetic field in the first main movement direction H1 mainly interacts electromagnetically with the drive magnets 4 of the first magnet group(s) MGa in order to move the respective shuttle Tn in the first main movement direction H1. Analogously, by activating the second drive coils AS2 that interact with the shuttle Tn, a substantially moving magnetic field is generated in the second main movement direction H2, which substantially moving magnetic field mainly interacts electromagnetically with the drive magnets 4 of the second magnet group(s) MGb in order to move the shuttle Tn in the second main movement direction H2. Depending upon the activation of the drive coils AS1, AS2 in the region of a shuttle Tn, the moving magnetic fields are superimposed, as a result of which the shuttle Tn can be moved in the desired manner along the pre-specified two-dimensional movement path P in the movement plane 3. As already mentioned also movements in further degrees of freedom could be realized as well.

The drive coils ASi are usually activated by energization in such a way that a force acts on the shuttle Tn also in the direction of the Z-axis, with which force the shuttle Tn is kept levitating above the movement plane 3 for generating an air gap L (FIG. 3*b*) (which is also possible while the shuttle Tn is at a standstill).

A long-stator linear motor, as further example of a linear motor 1 and as shown in FIG. 1, differs from a planar motor mainly in that the drive coils ASi are arranged next to each other along the stator 2 so that the movement plane is reduced to a movement track that is defined by the geometric shape of the stator 2. Also the LLM comprises at least one stator segment Sm that forms the stator 2.

FIG. 1 shows an example of a LLM as a transport system 1 in a certain application. For reasons of clarity, well-known guide structures for guiding a shuttle Tn along the stator 2 and/or for holding a shuttle Tn on the stator 2 are not shown in the FIG. 2. Such guide structures can be designed as desired and needed, for example using rollers.

A long-stator linear motor consists of a stator 2 and a number of shuttles Tn (with n>1), which can be moved along the stator 2. "n" is used as an index in order to be able to distinguish different shuttles, wherein, generally, the reference sign Tn is used when no specific shuttle is addressed. For the movement, drive coils ASi (with i>1) are arranged on the stator 2, one behind the other in a direction of movement along the stator 2. For the sake of clarity, only a few of the drive coils ASi are shown in FIG. 2. However, it is known that the drive coils ASi are arranged along the entire area of movement of the long-stator linear motor. At least one drive magnet 4, usually several drive magnets in the form of an arrangement of permanent magnets, is arranged on a shuttle Tn. This is only implied in FIG. 2 for reasons of clarity. The drive magnet 4 faces the drive coils ASi on the stator 2 and is separated from the drive coils ASi by an air gap.

The stator 2 can be composed of individual stator segments Sm (with m>1), with a number of drive coils ASi on each stator segment Sm as in FIG. 1. The stator 2 can also be composed of individual stator sections SAj (with j≥1) (as in FIG. 2), which can be interconnected via switches W and form the stator 2. "j" is used as an index in order to be able to distinguish different stator sections, wherein, generally, the reference sign SAj is used when no specific stator section is addressed. A stator section SAj can in turn be composed of a plurality of stator segments Sm. At a switch W, a shuttle Tn can switch over from one stator section SAj to another stator section SAj+1 and can continue its movement on the stator section SAj+1.

The drive coils ASi can be energized by applying a drive coil voltage $v_{ASi}$ and thus generate a drive electromagnetic field which interacts with the drive magnets 4 of a shuttle Tn to generate a force acting on the transport unit Tn. This force then serves as a propulsive force for moving the shuttle Tn along the stator 2 in the desired direction.

In an LLM, it is also possible for drive coils ASi to be arranged on both sides of the stator 2, as viewed in the direction of movement, and for the drive magnet 4 of a shuttle Tn to be moved therebetween (as indicated by the transport unit Tn in FIG. 1). If drive magnets 4 are also provided on both sides of the shuttle Tn as viewed in the direction of movement, then by energizing the drive coils ASi on both sides, forces (also different forces) acting on the shuttle Tn can also be generated on both sides simultaneously. With such an arrangement, electromagnetic switches W can in particular also be implemented on a linear long-stator linear motor.

A control unit 10 is provided in the machine 8, with which the drive coils ASi of the linear motor 9 are controlled for energizing, in order to generate the drive electromagnetic fields for moving the shuttles Tn. Essentially, this means that the required drive coils ASi are energized under control of the control unit 10 such that any shuttle Tn executes a desired movement path P in the movement plane 3 (PLM) or along the stator 2 (LLM) and with a desired motion profile (e.g. speed, acceleration). In case of an PLM, the movement path P is not limited only to a movement in the main movement directions H1, H2, but can also specify movements in the four other degrees of freedom. In case of an LLM the movement path P can also include different stator sections SAj connected by switches W. The movement path P can be defined, e.g., for implementing a transport task with the linear motor 9 as a transport device 1 in a machine 8 in which the linear motor 9 is integrated (as in FIG. 1 or 2). The drive coils ASi of the linear motor 1, are controlled by the control unit 10 such that a shuttle Tn moves along the desired movement path P and with the desired motion profile. To this end, the control unit 10 controls not only the movement path P but also the dynamics of the movement, especially speed, acceleration, jerk, at any point in time.

An actual value AV of the movement of a shuttle Tn, e.g., an actual position (also an actual orientation of the shuttle Tn) or an actual speed, is usually also used in the control unit 10 for the implementation or control of the movement of a shuttle Tn. For this purpose, suitable sensors, e.g., position sensors PS, can also be arranged on or along the stator 2, the detected measured variables of the sensors are transmitted as actual values AV of the movement of a shuttle Tn to the control unit 10 or actual values AV of the movement are determined in the control unit 10 from the detected measured variables.

In order to be able to determine the position of a shuttle Tn on the stator 2, position sensors PS (with s>1) can be arranged on the stator 2, as in the example of FIG. 1 or FIG. 2, with only some of the position sensors PS being shown for reasons of clarity. The position sensors PS provide the detected position signals, for example, as actual values AV to the control unit 10. However, known sensorless position detection can also be implemented in an LLM as well as in a PLM in order to detect the position of a shuttle Tn.

A position sensor PS can detect a magnetic field of the shuttle Tn, for example the magnetic field that emanates from the drive magnets 4, or one that emanates from particular position magnets on the shuttle Tn. Such a position sensor PS can be designed, for example, as a magnetostrictive sensor, magnetoresistive sensor or as a Hall sensor, although of course there are other types of sensors that are able to detect a magnetic field. However, sensors which detect a different physical variable are of course also conceivable, for example optical or inductive sensors.

Power electronics 15 (FIG. 1) can be provided in the linear motor 1 to generate the drive coil voltage $v_{ASi}$ of a drive coil ASi. The control unit 10 can control the power electronics 15 in order to energize the drive coils ASi in the desired manner, especially with the required electric drive coil current.

The control unit 10 can also be designed as a distributed controller (as in FIG. 1), e.g., having a number of coil control units 5, for example one coil control unit 5 per stator segment Sm, and a superordinate system control unit 6 that is connected to the number of the coil control units 5—for example, via a communications network 7. For example, the system control unit 6 can implement the transport task and pre-specify target points for the shuttle Tn in order to move the shuttle Tn according to a movement path P and according to the desired motion profile (dynamics of movement) to perform the transport task. A collision monitoring and avoidance for the shuttles Tn can also be implemented in the system control unit 6. A coil control unit 5 can be provided in order to convert the specifications of the system control unit 6 into drive coil voltages. However, this division into coil control unit 5 and system control unit 6 is only exemplary. In general, a control unit 10 is provided which controls the drive coils ASi in order to produce the desired movements of the shuttles Tn. However, how this control unit 10 is designed, for example in the form of a cascaded controller consisting of a plurality of interconnected controllers, is irrelevant for the present disclosure.

A control unit can in general be implemented as microprocessor-based hardware, e.g., as a computer, microcontroller, digital signal processor (DSP), programmable logic controller (PLC), etc., on which corresponding control programs for implementing the respective function run. An embodiment as an integrated circuit, such as, for example, an application-specific integrated circuit (ASCI) or field programmable gate array (FPGA), is also conceivable.

The control of the linear motor 1 operates in given control time steps, typically in the 10 to 100 μs range. This means that in each consecutive control time step, the drive coil voltages $v_{ASi}$ for all active drive coils ASi are calculated in the control unit 10 and the active drive coils ASi are energized with these drive coil voltages $v_{ASi}$, by the power electronics 15, for example. As the shuttles Tn move, the active drive coils ASi may and will usually also change in consecutive control time steps.

From the above description it is apparent that shuttles Tn or objects O transported on a shuttle can interact in numerous ways with other parts of the machine 8, like in a processing station 13 or with a handling device 14. In many applications, there will also be human operators 16 in the vicinity of LLMs or PLMs and the operator 16 can somehow interact with the LLM or PLM or parts thereof. Such interactions influence operation of the machine 8 and of the process carried out by the machine 8 in manifold ways.

The presence of human operators 16 (as in FIG. 2) in the vicinity of an LLM or PLM requires, for example, protection of the operator from the moving shuttles Tn as a collision of a moving shuttle Tn with a human being may inflict sever injuries to the human being. On the other hand, human machine interaction in which the machine 8 interacts with the human being or in which the human being interacts with the machine 8 for control of the machine 8 could be provided. The human machine interaction is usually realized with typical input devices, like keys, buttons, knobs, touchscreens, etc., and/or output devices, like lights, speakers, displays, etc. The disadvantage of such input/output devices is that these devices are usually stationary on an LLM or a PLM installation. For large LLM or PLM installation, this would require a great number of such input/output devices so that an operator 16 is able to interact with the LLM/PLM from different locations. The input/output device could also be integrated into a mobile control unit, carried by an operator 16. But this would require that the mobile control unit is always with the operator 16.

There is however not only a human machine interaction possible in a machine 8. In many machines 8 certain actions are triggered when certain conditions occur. An example is a typical manufacturing machine with at least one processing station 13 in which a certain task is performed on or with the product O. The task can be manifold and can even change the object O in a given way depending on the manufacturing process. The task can also be to allow the object O access to certain parts of the machine 8 or to set a switch W to guide the shuttle Tn on the correct stator section SAj. For that a barrier or a gate could be provided which needs to be opened, possibly depending on further conditions of the machine 8, before a shuttle Tn may pass. The task can also be to set a switch W to guide the shuttle Tn on the correct stator section SAj. For that a switch W could be provided which needs to be controlled, possibly depending on further conditions of the machine 8. This requires for example that the presence of an object O or a shuttle Tn at a given position of the machine 8, for example in the processing station 13 or ahead of switch W, must be detected which requires sensor technology. The object O or a shuttle Tn may also interact with the machine 8 in that a certain action of the machine 8 is triggered depending on the position or a condition of the shuttle Tn or object O. Sensor technology used for such interactions could include switches, proximity sensors, light barriers, etc. Each used sensor must be integrated in suitable way in the control of the machine 8 which can make the control quite complex.

In order to reduce complexity of the machine 8 without losing flexibility in the control of the machine 8, a new approach in operating a machine 8 comprising a linear motor 9 is suggested by the present disclosure.

The present disclosure utilizes the design of the machine 8 as described above, especially the design of the linear motor 9 of the machine 8 for operating the machine 8, which includes controlling the machine 8.

Figure 4:
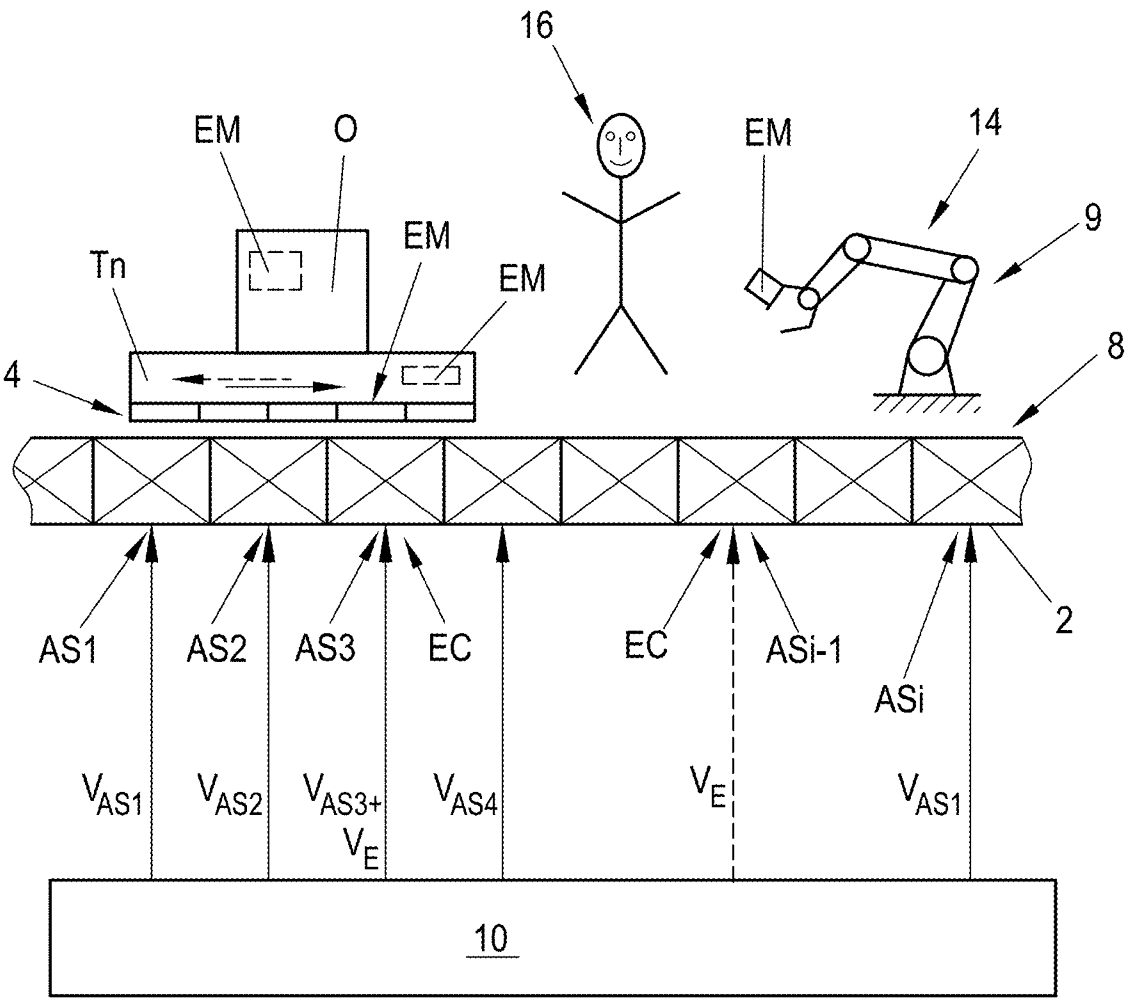
FIG. 4 is an exemplary embodiment of long stator linear motor with excitation magnets for generating sounds with a movable part of the machine.

According to the present disclosure, at least one excitation magnet EM is provided on a movable part of the machine 8 as shown in FIG. 4. The movable part of the machine can be a shuttle Tn of the linear motor 1 or a handling device 14, for example, or any other movable part of the machine 8. The moveable part could also be a gate or barrier that can be opened and closed. The excitation magnet EM can be arranged indirectly on the movable part of the machine 8 in that the excitation magnet EM is arranged on an object O that is transported in a shuttle Tn or by a handling device 14 with the excitation magnet EM being arranged on the object O (indicated in dashed line in FIG. 4). The moveable part can be any movable part of the machine 8 that can be moved in sufficient vicinity of an excitation coil EC so that the excitation magnet EM and the excitation coil EC can interact as described in the following.

In an advantageous embodiment of the present disclosure, the excitation magnet EM is a drive magnet 4 of a shuttle Tn of the linear motor 9. In this case, no additional magnet is required as the present drive magnet 4 can be used. The excitation magnet EM can however also be a separate magnet arranged as required on an object O or a shuttle (indicated with dashed line in FIG. 4) or other movable part of the machine 8.

At least one of the plurality of drive coils ASi of the linear motor 9 is used as excitation coil EC. The excitation coil EC is energized with an excitation coil voltage $v_E$ for generating an alternating excitation electromagnetic field in the vicinity of the excitation coil EC. The excitation electromagnetic field can also be generated by more than one drive coils Asi. The generated alternating excitation electromagnetic field interacts with the excitation magnet EM for producing mechanical vibrations of the movable part of the machine 8 in response to and depending on the excitation electromagnetic field. The mechanical vibrations cause a sound that is used for operation of the machine 8. For generating the desired effect (sound), the excitation magnet EM must be in sufficient proximity to the excitation coil EC. Depending on the design of the machine 8, the strength of the excitation electromagnetic field, the strength of the excitation magnet EM and so on, different distances can be required but the required minimal distance can be assumed to be known from the design of the machine 8 or from test carried out on the machine 8.

The excitation coil EC can be one of the active drive coils ASi used for generating the drive electromagnetic field for generating the force(s) for moving the shuttle Tn. In this case it is advantageous that the excitation coil voltage $v_E$ is superimposed onto the drive voltage $V_{Asi}$ (as in FIG. 4 for the drive coil AS3). It is also conceivable that several active drive coils Asi for driving the shuttle Tn are simultaneously energized with an excitation coil voltage $v_E$, also with different excitation coil voltages $v_E$. The resulting different excitation electromagnetic fields can interact with the same excitation magnet EM or with different excitation magnets EM. It would however also be possible that such an active drive coil ASi or any other drive coil ASi is only energized with the excitation coil voltage $v_E$ (shown dashed in FIG. 4 for drive coil ASi−1).

The generated mechanical vibrations of the movable part of the machine 8 and also the resulting sound depend on the excitation coil voltage $v_E$, especially on the frequency of the alternating excitation coil voltage $v_E$ and on the amplitude of the excitation coil voltage $v_E$. It is therefore possible to control the pitch (frequency of sound) and the volume of the generated sound. Also sound effects like a beat could be produced. When the movable part of the machine is simultaneously excited with several excitation electromagnetic fields then it is even possible to generate a sound with several frequencies, e.g. two separate independent tones. Also the waveform of the excitation coil voltage $v_E$ can influence the generated sound. A sine-shaped excitation coil voltage $v_E$ will produce a sound with a specific frequency. The rectangular-shaped excitation coil voltage $v_E$ will however produce a sound with harmonics, like a fundamental tone and overtones. Also other waveforms, like in the form of a Chirp-Signal or Sweep-Signal, are possible.

It is also conceivable that several shuttles Tn are used to generate a specific sound, like a specific chord sequence, sound spectrum or a tune. A first shuttle Tn could be used for generating the basic tone, a second shuttle Tn+1 for generating a first overtone or a second tone, a third shuttle Tn+2 for generating a second overtone or third tone, and so on. In this way a certain polyphonic tune could be generated or a certain musical instrument could be emulated.

The excitation coil voltage $v_E$ could also be controlled in order to generate speech like sound. This would allow implementation of a voice output on the machine 8.

The generated sound may even travel with the shuttle Tn. When always at least one of the active drive coils ASi for moving the shuttle Tn is used as excitation coil EC, then the sound is generated by the moving shuttle Tn and travels with the shuttle Tn.

It is to be noted however, that the generated sound does not have to be audible. Even a sound in an inaudible frequency range could be used in accordance with the present disclosure, for controlling certain functions of the machine 8, for example.

The correlation between the excitation coil voltage $v_E$ and the resulting sound can be assumed to be known in advance, for example from tests with the machine 8 or from simulations. It is therefore possible to generate specific sounds.

As the sound generation with the excitation coil voltage $v_E$ and the movement of the shuttle Tn with the drive coil voltage $v_{ASi}$ are independent from each other, the excitation coil voltage $v_E$ does only negligibly influence the movement of a shuttle Tn, if the shuttle Tn is used as movable part of the machine 8. This means that the movement of the shuttle Tn is controlled with the drive coil voltage $v_{ASi}$ independent from a possible sound generation.

In some embodiments, the excitation coil voltage $v_E$ is controlled by the control unit 10. This is shown in a possible embodiment in FIG. 5 for the example of controlling the movement of a shuttle Tn of an LLM. A movement controller 20 is implemented in the control unit 10, for example as control software that runs on computer hardware of the control unit 10. The control unit 10 receives a set point SP for controlling the movement of the shuttle Tn. The setpoint SP could be set point position or set point speed of the shuttle Tn, or any other suitable setpoint. The control unit 10 receives also an actual value AV of the movement of the shuttle Tn, like an actual position from a position sensor PS or actual speed of the shuttle Tn, for example. As usual in a closed-loop control, a control error as difference between the set point SP and the actual value AV is determined. A controller 20, like a well-known PID controller, calculates a manipulated variable MP for reducing the control error. The manipulated variable MP is used to energize the active drive coil(s) used for driving the shuttle Tn, and is a drive coil voltage $v_{ASi}$ for example.

Figure 5:
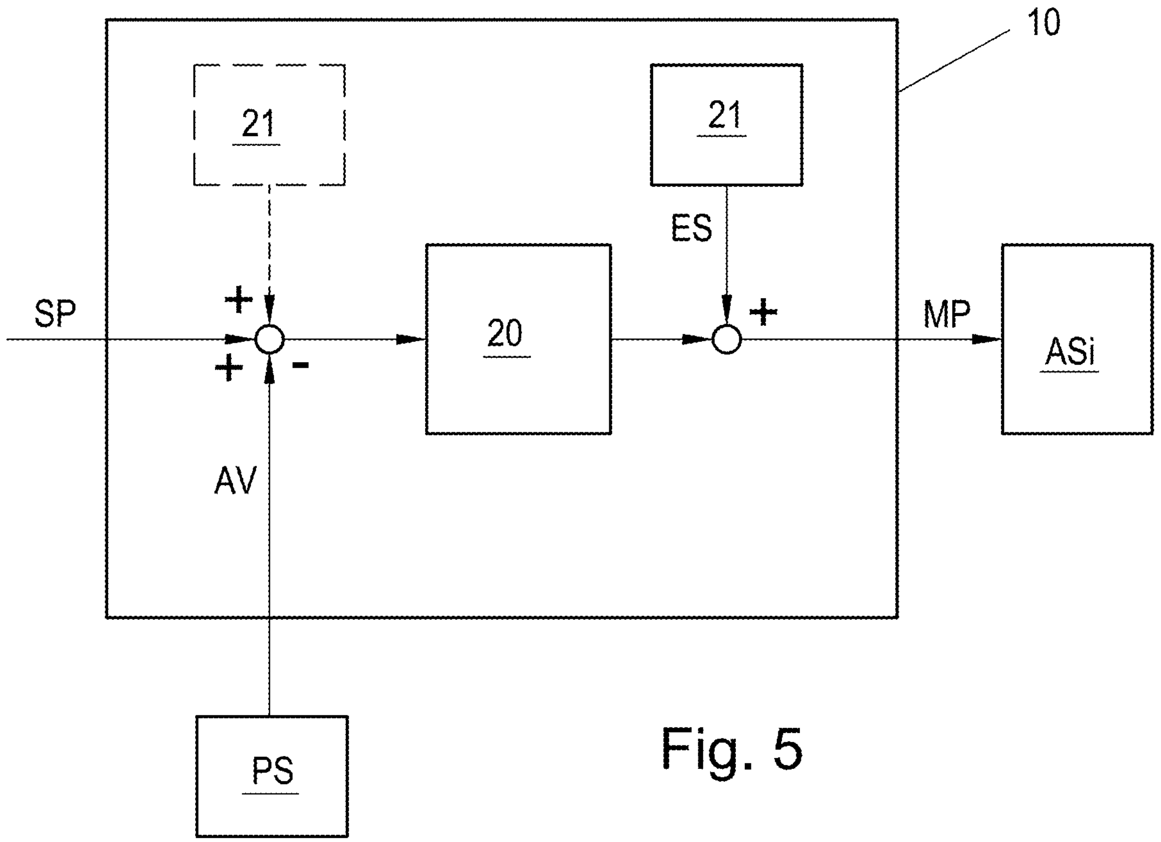
FIG. 5 is an example of a control unit of the linear motor of the transport device.

The control unit 10 comprises an excitation unit 21 that calculates an excitation signal ES that is superimposed onto the manipulated variable MP, or alternatively onto the setpoint SP (shown dashed in FIG. 5). The excitation signal ES causes the alternating excitation coil voltage $v_E$. The controller 20 could also be implemented as cascaded controller comprising several successive controllers as is well known. The controller 20 could, for example, comprise a speed controller that is followed by a force controller that is followed by a current controller. In such a cascaded controller, the excitation signal ES could basically be superimposed on an input or output of one of the cascaded controllers.

The control of the shuttle Tn determines a manipulated variable MP in given time steps of the control, like 200 µs, for example. In each time step, the excitation signal ES is used to generate the desired excitation coil voltage $v_E$. When a full period of the excitation coil voltage $v_E$ is generated with five sampling points, then it would take five times 200 µs for generating a full period of the excitation coil voltage $v_E$. The excitation coil voltage $v_E$ is composed of a number of successive excitation signals ES. With an assumed control time step of 200 µs, this would result in an achievable maximum frequency of the excitation coil voltage $v_E$ of 1 kHz (1/(5*200 µs)). When the control time step is shorter, for example 50 µs, then higher frequencies are achievable. A higher number of sampling points would improve the temporal resolution of the excitation coil voltage $v_E$, but would on the other hand reduce the achievable maximum frequency.

When a drive coil ASi is used for generating the excitation electromagnetic fields that is not used for driving a shuttle Tn, the excitation signal ES would not be superimposed onto a set point SP or a manipulated variable MP, but could directly be used for energizing the drive coil ASi.

The generation of the excitation coil voltage $v_E$ could however also be completely separated from the generation of the drive coil voltage $v_{ASi}$ used for producing a drive electromagnetic field.

The present disclosure allows for different use cases for operating a machine 8 according to the disclosure. This is described in the following with some non-limiting and non-exhaustive examples.

The sound generated by a moving shuttle Tn can be used for warning a human operator 16 present in the vicinity of the machine 8. An operator 16 could interrupt a light barrier or trigger another sensor indicating access of the operator 16 into a certain region of the machine 8. When the machine 8 is still in an unsafe state in which the movement control of the shuttles Tn is still active or in which shuttles Tn are still moving, the moving shuttles Tn could then generate a warning sound for the operator 16.

A shuttle Tn in an abnormal state could generate a specific sound indicating need for maintenance. The abnormal state could be detected by the control unit 10, for example as described in EP 3 251 985 A1.

A shuttle Tn could indicate a certain operation state with a specific sound. A shuttle Tn carrying an object O that is to be discarded from the process flow of the machine 8 could generate a specific sound that indicates this state to an operator 16 when the shuttle Tn reaches a given position on the linear motor 9.

A drive coil ASi could permanently be excited with an excitation coil voltage $v_E$, or excited when a shuttle Tn is nearby, to generate a sound every time a shuttle Tn passes the drive coil ASi. This could be used as warning barrier at a certain position of the linear motor 9 to generate a warning sound, for example for the operator 16, every time a shuttle Tn passes the defined position.

A specific sound could be generated by a shuttle Tn or by several shuttles Tn signalizing an upcoming emergency stop of the machine 8. A specific sound could be generated at start-up of the machine 8.

A specific sound could indicate a calibration phase of the shuttle Tn, where the operator 16 is not allowed to apply a force on the shuttle Tn to avoid wrong parameter identification results.

A non-ideal state of a stator segment Sm can be indicated by a specific sound by exciting one or more drive coils ASi with an excitation coil voltage $v_E$ in this region. A distorted or deformed housing cover of the stator segment Sm leads to regions of the stator 2 where shuttles Tn could touch the stator segment surface (no air gap), which could affect the movement of the shuttle Tn and could damage the stator 2 and/or the shuttle Tn.

The machine 8 itself could initiate specific sounds indicating certain warnings to the operator 16. This could also be used by the machine 8 to generate and indicate instructions to the operator 16, for changing or cleaning of certain parts of the machine 8, for example. The instruction to the operator 16 could also be output in the form of speech.

A shuttle Tn or an object on a shuttle Tn could trigger a certain action using a specific sound. This could be used in a processing station 13, for example, to start a process when an object O is present in the processing station 13. The sound could be used with an excitation magnet EM on the object O and at least on drive coil ASi in the processing station 13. This would also allow to start different processes by using different sounds depending on the state of the object O for example. To this end a microphone could be used in the processing station 13 for detecting the sound. With only one microphone, different sounds, each indication or triggering a certain action, could be detected.

The presence or the approach of a handling device 14 could also be indicated using a specific sound. In this case, the excitation magnet EM could be arranged on the handling device 14, for example on a manipulator of the handling device 14, or on an object O carried by the handling device 14. When the handling device 14 reaches a certain position, a specific sound could be generated triggering or indicating a certain action in the machine 8.

The generated sound could be used to excite resonances of a container as object O. The resonance frequency would depend on the filling level of the container. The excitation frequency can be adapted until the volume of the generated sound, for example measured by a microphone, reaches its maximum. The known correlation between the resonance frequency and the filling level can then be used to control the filling process or to determine the filling level.

Generates ultrasonic sound could even be used for ultrasonic cleaning of the excited moveable part of the machine 8.

These examples show how flexible the inventive can be used for the operation of a machine 8 with a linear motor 9 in the form of an LLM or PLM.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

The invention claimed is:

1. A method for operating a machine comprising a transport device that comprises a linear motor, wherein the linear motor of the transport device comprises a plurality of drive coils and at least one shuttle having a drive magnet, and wherein at least one excitation magnet is provided on a movable part of the machine, the method comprising:

energizing the plurality of drive coils with a drive coil voltage to generate a drive electromagnetic field that interacts with the drive magnet of the at least one shuttle to drive the at least one shuttle;

energizing at least one of the plurality of drive coils, used as an excitation coil, with an excitation coil voltage to generate an alternating excitation electromagnetic field, the alternating excitation electromagnetic field interacting with the excitation magnet to produce mechanical vibrations of the movable part of the machine, the mechanical vibrations causing a sound; and using the sound for the operation of the machine.

2. The method according to claim 1, wherein frequency of the sound is used to trigger a given action in the machine or to indicate a certain state of a part of the machine.

3. The method according to claim 1, wherein the excitation magnet is provided on the at least one shuttle of the linear motor of the transport device.

4. The method according to claim 3, wherein the drive magnet of the at least one shuttle is simultaneously used as excitation magnet.

5. The method according to claim 1, wherein the excitation magnet is provided on an object transported with the at least one shuttle of the linear motor of the transport device, the object separate from the at least one shuttle.

6. The method according to claim 1, wherein:

the machine comprises a handling device with the movable part, and the excitation magnet is provided on the movable part or on an object moved with the handling device.

7. The method according to claim 1 wherein the excitation coil voltage of a drive coil, different from the drive coil voltage, is superimposed on the drive coil voltage of the drive coil.

8. The method according to claim 1, wherein each one of several drive coils is energized with the excitation coil voltage simultaneously to generate the alternating excitation electromagnetic field.

9. The method according to claim 1, wherein:

the at least one shuttle is moved by generating a moving drive electromagnetic field by successively energizing successive drive coils with the drive coil voltage, and the excitation coil voltage is applied to at least one of the successive drive coils or is superimposed onto the drive coil voltage of at least one of the successive drive coils.

10. The method according to claim 9, wherein the excitation coil voltage is applied to several of the successive drive coils or is superimposed onto the drive coil voltage of several of the successive drive coils.

11. The method according to claim 1, wherein the linear motor of the transport device is designed as long stator linear motor or as planar motor.

12. The method according to claim 1, wherein the alternating excitation electromagnetic field comprises a frequency and an amplitude, the alternating excitation electromagnetic field configured to cause the sound based on the frequency and the amplitude.

13. The method according to claim 1, wherein the alternating excitation electromagnetic field comprises a sine wave, rectangle wave, chirp signal, or sweep signal.

14. The method according to claim 9, wherein the excitation coil voltage negligibly influences movement of the at least one shuttle.

* * * * *